United States Patent

[11] 3,617,349

| [72] | Inventor | Herbert F. Prasse<br>Town and Country, Mo. |
|---|---|---|
| [21] | Appl. No. | 867,632 |
| [22] | Filed | Oct. 20, 1969 |
| [45] | Patented | Nov. 2, 1971 |
| [73] | Assignee | Ramsey Corporation<br>St. Louis, Mo. |

[54] A METHOD OF MAKING ANTIFRICTION PISTON RINGS
13 Claims, 10 Drawing Figs.

[52] U.S. Cl. .................................................. 117/71 M, 277/235 A
[51] Int. Cl. .................................................. B05b 7/20, F02f 3/10
[50] Field of Search .......................................... 277/235 R, 235 A; 117/71 M

[56] References Cited
UNITED STATES PATENTS
444,794   1/1891   Cook .............................. 136/121

| 2,700,623 | 1/1955 | Hall .............................. | 117/71 M |
| 2,798,005 | 7/1957 | Love .............................. | 277/MD |
| 3,404,606 | 10/1968 | Papst .............................. | 277/236 X |

FOREIGN PATENTS

| 708,562 | 5/1954 | Great Britain .............. | 277/235 A |
| 930,089 | 7/1963 | Great Britain .............. | 277/235 A |
| 931,575 | 7/1963 | Great Britain .............. | 117/71 M |

Primary Examiner—Winston A. Douglas
Assistant Examiner—M. J. Andrews
Attorney—Hill, Sherman, Meroni, Gross and Simpson ABSTRACT: Covers a piston ring having a bearing face coated with a hard porous metal or metal alloy having its pores impregnated therein with a solid antifriction agent. The ring is produced by first coating its bearing face with a hard porous metal or metal alloy and then heating the coated ring to drive the air from the pores of the coating. Thereafter, the ring is contacted while still hot with an antifriction agent dissolved or dispersed in a liquid carrier. The antifriction agent is drawn into the pores of the coating and remains therein as an impregnant of said coating, while the liquid carrier upon contacting the heated piston ring is evaporated therefrom.

INVENTOR
Herbert F. Prasse

INVENTOR
Herbert F. Prasse

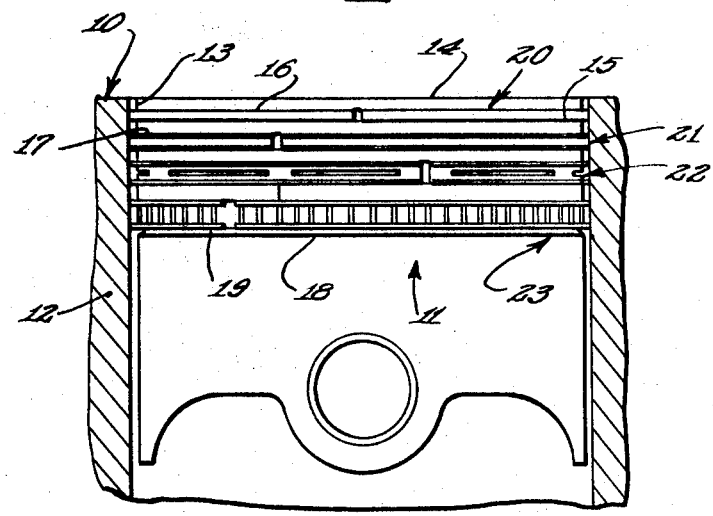
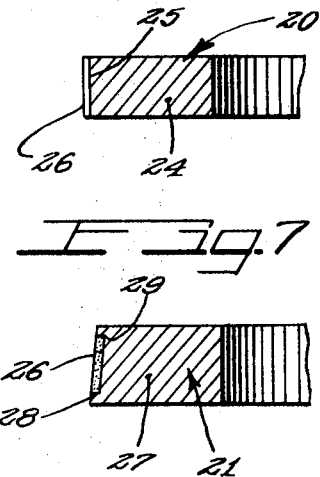
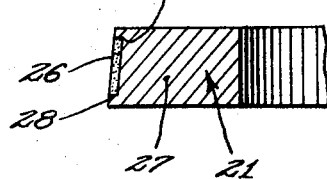
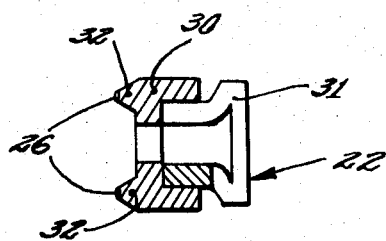
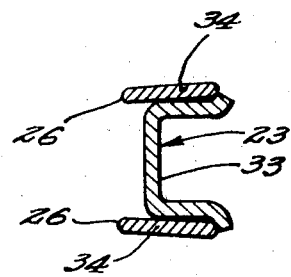
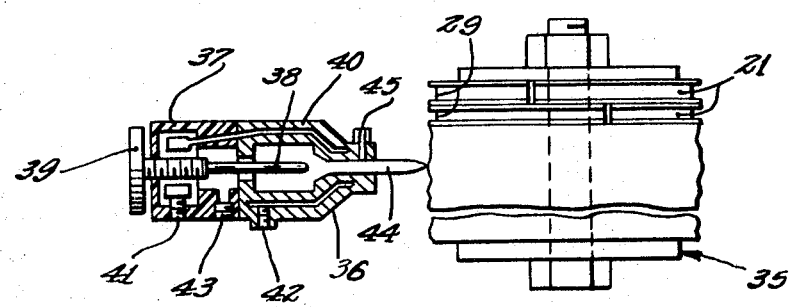

A METHOD OF MAKING ANTIFRICTION PISTON RINGS

BACKGROUND OF THE INVENTION

1. Field of the Invention

This invention relates to the packing ring or piston ring art and to the provision of bearing faces on piston rings. The invention particularly deals with coatings on piston rings which exhibit exceptional antifriction characteristics, particularly valuable in the startup operating period of internal combustion engines.

2. Description of the Prior Art

One of the most critical times for the operation of the cylinder-piston assembly of an internal combustion engine is during its initial operation of "break-in" period. During this preliminary engine operation there are a number of physical and perhaps chemical changes of the running surfaces of the piston rings and cylinder barrels. After this period of time usually, say about 1000 miles, the properties of the surfaces of the piston rings and cylinder bore have been altered which should then result in optimum performance characteristics. It is during this initial period of time that a piston ring including both compression and oil control rings should exhibit maximum antifriction or scuff resistance properties.

To achieve close fit with piston rings cylinder bores are normally honed or polished. However, it has been found that this operation does present a drawback in that the graphite pockets in the cylinder normally leading to the surfaces have been closed. Therefore, the natural antifriction property of the cylinder has been substantially lessened.

To overcome the above, it has been proposed that the bearing face of a piston ring be coated with a dry film lubricant such as graphite. However, the surface coating is quickly obliterated after a relatively short period of engine operation, and the desired antifriction property lost. Chances for scuffing are then materially greatened.

It would therefore be a substantial advance in the art if a piston ring were discovered which had a hard wearing surface and yet exhibited the desired antifriction property, particularly during the time of engine break-in but also beyond that point.

SUMMARY OF THE INVENTION

The present invention provides hard-faced piston rings which also exhibit long term antifriction properties of particular value during the break-in period of an internal combustion engine. This antifriction quality of the piston ring remains well beyond this initial critical period of time.

The piston ring of the invention is broadly defined as one having a bearing face coated with a hard porous metal or metal alloy. In order to effectuate the aim of antifriction quality the pores of the metal or metal alloy have impregnated therein a solid antifriction agent such as graphite. The concept of impregnation is particularly important in order to provide a long lasting period of lubrication, particularly during the initial period of engine break-in. A mere lubricant coating of the metal coated bearing face is ineffectual by reason of its being used up prior to the termination of the break-in period.

The invention is also concerned with a method of making the just-described piston ring. This includes the steps of coating the bearing face of a piston ring with a hard porous metal or metal alloy. The coated ring is then heated to drive the air from the pores of the coating. The still hot piston ring is then contacted with an antifriction agent which is dissolved or dispersed in a liquid solvent acting as a carrier. Upon contact of the ring the antifriction agent is drawn into the pores of the coating and remains therein as an impregnant of the coating. Meanwhile, the liquid carrier contacting the hot surface of the piston ring is volatilized from the ring.

It is therefore the object of the invention to provide an improved piston ring.

A more specific object of the invention is to provide a piston ring having its bearing face treated such that it exhibits both long wear in use, and as well demonstrates excellent lubricity, particularly during the engine break-in period, therefore substantially lessening cylinder scuffing leading to engine failure.

A still further object of the invention is to provide the above antifriction ring whereby engine torque can be materially reduced when compared to like use of prior art coated piston rings.

Still another object of the invention is to provide a simple yet efficient method of making the above-described piston rings without resort to a multistep costly and complicated procedure.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 5 is a side elevational view, with parts in cross section, of an engine piston and cylinder assembly, wherein the piston has ring grooves equipped with compression and oil control rings, each having a bearing face engaging the cylinder which is composed of an in situ formed plasma jet applied coating;

FIG. 6 is an enlarged fragmentary cross-sectional view of the top compression ring in the piston of FIG. 5;

FIG. 7 is a view similar to FIG. 6, illustrating the second compression ring in the piston of FIG. 5;

FIG. 8 is a view similar to FIG. 6 but illustrating the oil control ring in the third ring groove of the piston of FIG. 5;

FIG. 9 is a view similar to FIG. 6, but illustrating the oil control ring in the fourth ring groove of the piston of FIG. 5; and FIG. 10 is an elevational view of an arbor of piston rings being plasma jet coated.

DESCRIPTION OF THE PREFERRED EMBODIMENTS

Figure 1:
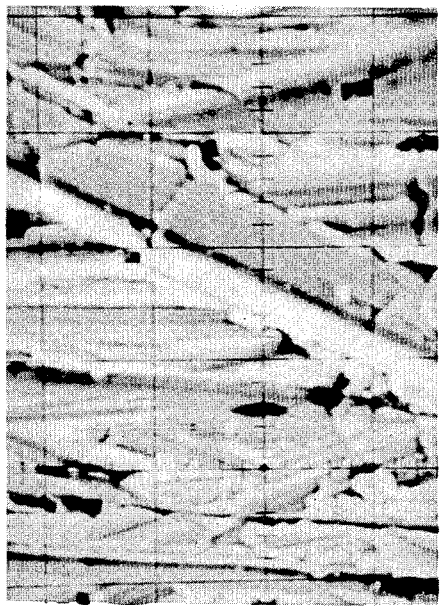
FIG. 1 is a photomicrograph of the surface of a cylinder after honing prior to operation.

As noted above, the piston rings of the invention are those having a bearing face coated with a hard porous metal or metal alloy. Impregnated in the pores of the metal is an antifriction agent.

The piston ring may be first coated with the metal or metal alloy in any conventional manner, although, it is greatly preferred that the piston rings be coated utilizing a plasma jet spray technique, as will be discussed in more detail hereinafter. The coating itself may be derived from a number of metal or metal alloys with the only requirement being that it have sufficient porosity to absorb a substantial amount of the antifriction agent. Base coatings which may be utilized here include such coatings as molybdenum, molybdenum alloys, tungsten carbide alloys, chromium carbide alloys, alumina-titania, zirconium oxide, etc. For best results the porous metal or metal alloy should have an open porosity ranging from about 7 percent to about 30 percent by volume of the outer surface of the thus-coated bearing face. More often, the porosity ranges from about 7 percent to about 20 percent. Again, the pore opening should be sufficiently large to allow sufficient inclusion of the antifriction agent. Normally the pore openings range from about 0.2 microns to about 10 microns. Preferred coatings include molybdenum, molybdenum alloys, and tungsten carbide alloys.

As mentioned above, the initial or base coatings are preferably applied by resort to a plasma jet spray procedure wherein the coating is formed in situ on the bearing face of the ring. The coating is usually applied by resort to a powder containing the various metals or metal alloys as powder ingredients.

A typical coating will be formed from a powder containing tungsten carbide and other metals as follows:
- 25 to 55 percent by weight tungsten carbide
- 4 to 8 percent by weight cobalt
- 25 to 45 percent by weight nickel
- 3 to 7 percent by weight chromium
- 0 to 7 percent by weight aluminum
- 0 to 3 percent by weight boron
- Balance—substantially iron.

The tungsten carbide content of the above powder may be admixed with or replaced by other carbides such as the carbides of metals or metalloids from the group including titanium, tantalum, columbium, molybdenum, vanadium, chromium, zirconium, hafnium, silicon, and boron.

A specific tungsten carbide powder is a mixture of the following compositions:
- 40 percent by weight tungsten carbide
- 6 percent by weight cobalt
- 36.5 percent by weight nickel
- 6 percent by weight chromium
- 1 percent by weight boron
- 0.7 percent by weight aluminum
- Balance—substantially iron, with minor amounts of silicon and carbon.

Other preferred coatings are molybdenum-derived coatings, either molybdenum itself or a molybdenum alloy. One molybdenum powder has the following composition:
- 65 percent to 90 percent by weight molybdenum
- 7 percent to 25 percent by weight nickel
- 1 percent to 6 percent by weight chromium
- 0.3 percent to 1.5 percent by weight boron
- 0.2 percent to 1.5 percent by weight silicon
- Balance—iron with small amounts of carbon and cobalt.

A preferred molybdenum powder has the following range of elements:
- 65 percent to 90 percent by weight of molybdenum
- 7 percent to 24.5 percent by weight of nickel
- 1.6 percent to 5.8 percent by weight of chromium
- 0.4 percent to 1.3 percent by weight of boron
- 0.3 percent to 1.4 percent by weight of silicon
- Balance—iron with small amounts of carbon and cobalt.

One specifically preferred powder mixture has the following composition:
- 75 percent by weight molybdenum
- 17.5 percent by weight nickel
- 4.12 percent by weight chromium
- 0.94 percent by weight boron
- 1.00 percent by weight silicon
- Balance—iron with small amounts of carbon and cobalt.

Another preferred powder has the following range of elements:
- 65 to 90 percent by weight of molybdenum
- 3.5 to 12 percent by weight of nickel
- 3 to 10 percent by weight of chromium
- 1.5 to 5 percent by weight of tungsten
- 1 to 3 percent by weight of cobalt
- 0.8 to 3 percent by weight of iron
- 0.2 to 1 percent by weight of carbon
- Balance—silicon and manganese.

One specific powder mixture falling within the above range has the following composition:
- 80 percent by weight molybdenum
- 7 percent by weight nickel
- 6 percent by weight chromium
- 3 percent by weight tungsten
- 2 percent by weight cobalt
- 0.8 percent by weight iron
- 0.4 percent by weight carbon
- Balance—silicon and manganese.

A still further preferred powder mixture has the following range of elements:
- 65 to 90 percent by weight of molybdenum
- 6.5 to 25 percent by weight of nickel
- 1.3 to 7 percent by weight of chromium
- 0.3 to 1.7 percent by weight of silicon
- 0.2 to 1.7 percent by weight of Boron
- 0.3 to 1.7 percent by weight of iron
- 0.1 to 0.4 percent by weight of cobalt
- Balance—carbon and manganese.

Another specific powder mixture falling within the just-enumerated range of elements has the following composition:
- 80 percent by weight molybdenum
- 14.6 percent by weight nickel
- 2.8 percent by weight chromium
- 0.8 percent by weight silicon
- 0.6 percent by weight boron
- 0.7 percent by weight iron
- 0.2 percent by weight cobalt
- Balance—carbon and manganese.

After the piston ring has been properly coated with a porous type of coating, it is then impregnated with an antifriction agent. This is carried out by first heating the coated piston ring to say 300–400° F. to drive the air from the pores of the coating. Immediately thereafter while the ring is still hot it is contacted with a solution or dispersion of the antifriction agent. The antifriction agent is then drawn into the pores of the coating, remaining there as an impregnant, while the liquid carrier is evaporated upon contacting the hot piston ring.

The actual contact step of ring and antifriction agent may be carried out via a variety of techniques such as spraying the antifriction agent on the hot ring or immersing the ring in a solution or dispersion containing the antifriction agent.

The antifriction agent may be chosen from a wide variety of materials including such lubricants as graphite, zinc stearate, mica, fibrous talc, magnesium oleate, calcium palmitate, barium stearate, molybdenum sulfide, aluminum sulfide, Teflon, and combinations of the above. A preferred antifriction agent is graphite.

Again, the solvent or dispersing medium for any one or more of the above antifriction agents may be chosen from a wide variety of liquids such as alcohols, benzene, toluene, xylene, aliphatics, esters, ethers, halogenated hydrocarbons, kerosene, substituted benzenes, etc. For example, a typical solvent for graphite is mineral spirits.

After the above steps have been followed the thus impregnated ring coating is ready for use. A sufficient amount of antifriction agent is present in the coating to last at least through the break-in period of the engine. The friction level is then maintained at a low level and temperature problems are avoided. Piston rings containing the dry film lubricant or antifriction agent may be employed in diesel engines and gasoline engines, giving equally good protection in both. After the initial break-in period, usually considered to be at least 1000 miles, the graphite begins to be exposed in the cylinder bore itself. Until this time the antifriction agent such as graphite from the ring is provided for proper protection.

The antifriction rings of the invention are particularly useful in low emission engines. In engines of this type which remain hot after stopping it is imperative to have a relatively high cranking speed. Thus, one needs low friction rings in order to crank the engine fast enough with current ordinary batteries.

Turning now to the drawings, FIG. 1 is a photomicrograph of the surface of a cylinder after being honed. The picture magnified 750 times shows that the graphite pockets near the surface have been closed by the honing operation. In this regard it is interesting to note that up to about 1000 miles of use the cylinder bores did not exhibit graphite pockets even at the turn-around point of the ring, which is the area of most wear. Thus, during the critical break-in period and for some time thereafter the graphite of the cylinder would not be available as an antifriction agent. It is evident then that the impregnated piston coatings of the invention are extremely useful during this period.

Figure 2:
FIG. 2 is a photomicrograph of a cylinder surface after a period of operation.

FIG. 2 is a photomicrograph showing a portion of a cylinder surface in ring travel after about 1000 miles of operation. The magnification here was again 750 times. It is evident now that graphite pockets are available at the surface of the cylinder, and the graphite available as a dry lubricant. However, as noted above, prior to about 300 hours of wear the graphite was not available due to honing of the cylinder.

Figure 3:
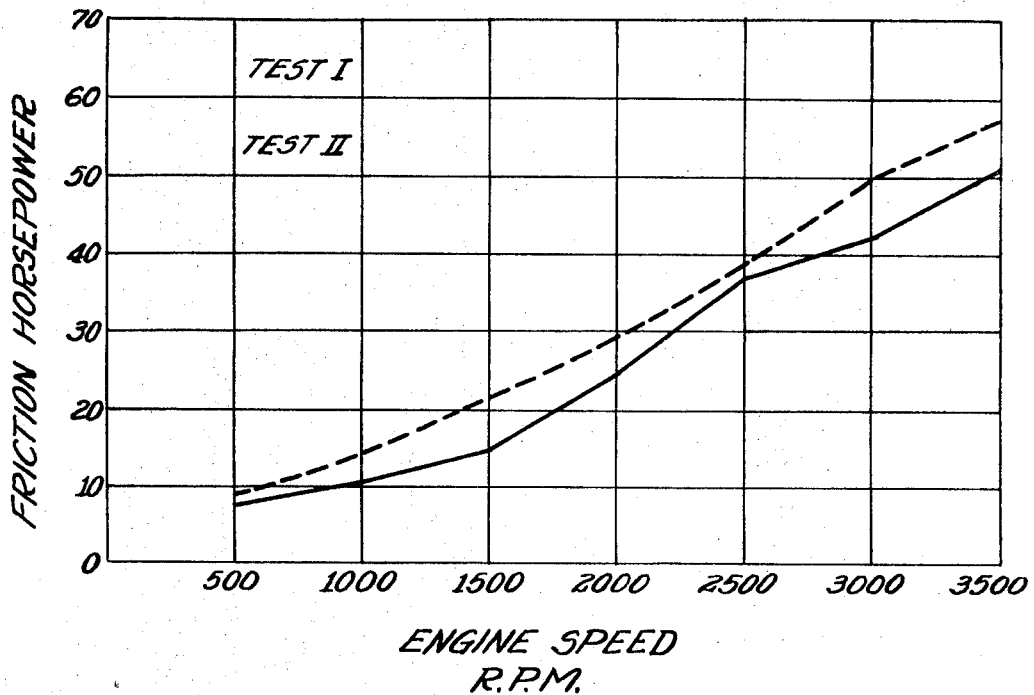
FIG. 3 is a graph relating engine speed to friction horsepower with a piston ring of the invention compared to a prior art piston ring.

FIG. 3 is a graph showing the reduced friction at various engine speeds utilizing a graphite impregnated molybdenum coated piston rings versus a nonimpregnated molybdenum piston ring. In test I, involving a molybdenum coating ring, engine speeds at various r.p.m.'s are plotted against friction horsepower as a dotted line. A like plot is shown as a solid line involving a graphite-impregnated molybdenum ring in test II. It is clearly evident that the graphite impregnation materially reduced friction due to pressure of the antifriction agent, here being graphite.

Figure 4:
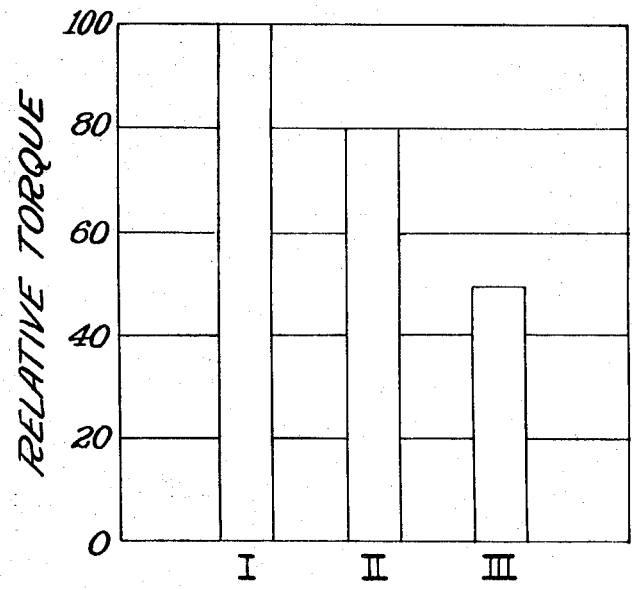
FIG. 4 is a graph comparing static breakaway torque utilizing a piston ring of the invention compared to prior art piston rings.

FIG. 4 again shows improved engine performance using a graphite impregnated ring. Here, static breakaway torque was compared with three rings. The first was a barrel face chrome compression ring designated on the graph as I. The second was a barrel face molybdenum compression ring designated as II on the graph. The third was a piston ring of the invention, here a barrel face molybdenum graphite-impregnated compression ring designated III. It is apparent from the graph of FIG. 4, that there is required a 100 percent increase in relative torque in an engine utilizing a chrome compression ring compared to a like engine wherein there is employed a graphite-impregnated molybdenum coated ring. Likewise, there is greater than a 50 percent increase in relative torque utilizing a molybdenum coated compression ring versus the graphite impregnated molybdenum coated compression ring of the invention. Again, the antifriction property of the rings of the invention is amply demonstrated in this work.

The remaining figures, FIGS. 5-10, illustrate typical piston rings which may be coated, coated rings thereof, and the preferred method of coating these rings by plasma jet coating techniques.

The piston and cylinder assembly 10 of FIG. 5 illustrates generally a conventional four-ring groove internal combustion engine piston, operating in an engine cylinder. The assembly 10 includes a piston II and an engine cylinder 12 with a bore 13, receiving the piston 11. The piston 11 has a head 14 with a ring band 15 having four peripheral ring grooves 16, 17, 18 and 19 therearound. The top ring groove 16 has a split solid cast iron compression or fire piston ring 20 therein. The second ring groove 17 has a split solid second compression ring 21 somewhat wider than the ring 20. The third ring groove 18 carries a two-piece oil control ring assembly 22. The fourth or bottom ring groove 19 carries a three-piece oil control ring assembly 23.

As shown in FIG. 6, the top compression or fire ring 20 has a main body 24 composed of cast iron, preferably nodular gray iron, with a carbon content of about 3½ percent by weight. The outer periphery 25 of this ring is covered with a hard refractory coating 26, which may be, for example, a plasma jet applied molybdenum or molybdenum alloy coating.

As shown in FIG. 7, the second compression ring 21 has a main body 27 composed of the same type of cast iron as the body 24 of the ring 20. The outer periphery 28 of the body 27 is inclined upwardly and inwardly from the bottom edge of the ring, and a peripheral groove 29 is formed around this inclined periphery. The groove 29 is filled with the coating 26.

As shown in FIG. 8, the oil control ring assembly 22 in the third ring groove 18 is composed of a one-piece flexible channel ring 30 and a sheet-metal expander ring 31, having legs extending into the channel for expanding the ring 30. The ring 30 and the expander are more fully described in Mayhew et al. Pat. No. 3,281,156.

The one-piece control ring 30 has a pair of axially spaced, radially projecting beads 32. The peripheries of these beads 32 are coated with the coating 26.

In FIG. 9, the oil control ring assembly 23 includes a resilient spacer-expander ring 33 supporting and expanding split thin rail rings 34. The assembly 33 is of the type disclosed in Marien U.S. Pat. No. 3,133,739. The outer peripheries of the rail rings 34 are coated with the coating 26.

From the above description, it will be understood that the bearing faces of each of the compression and oil control rings 20, 21, 22 and 23 are coated with some hard facing prior to being impregnated with an antifriction agent. These bearing faces 26 ride on and sealingly engage the bore 13 of the engine cylinder 12, and the rings are compressed in the bore 13, so as to extend tightly against the bore wall, and maintain a good sealing sliding engagement therewith.

As shown in FIG. 10, the coatings 26 are applied on the rings as for example on the grooved rings 21 by stacking a plurality of the rings on an arbor 35, with the rings compressed so that their split ends will be in abutment. The arbor clamping the stack of rings in their closed, contracted position may be mounted in a lathe and peripheries of the rings machined to form the grooves 29 therearound. The outer peripheries of the rings 21 on the arbor are then coated with the coatings 26 from a plasma jet spray gun 36. The gun 36 includes an insulated casing such as Nylon 37, from which projects a rear electrode 38, the projection of which is adjustably controlled by a screw knob 39. The front face of the casing receives a front electrode 40. The casing 37 and electrode 40 are hollow and water-jacketed so that coolant may circulate therethrough from an inlet 41 to an outlet 42. Plasma jet gas is fed through an inlet 43 into the chamber provided by the casing 37 and the electrode 40 to flow around the electrode 38.

The front end of the electrode 40 provides a nozzle outlet 44 for the plasma flame and the ingredients to form the coating 26 are fed to this nozzle through a powder inlet 45, just in advance of the discharge outlet of the nozzle.

A plasma composed of ionized gas is produced by passing the plasma gas from the inlet 42 through an electric arc established between the electrodes 38 and 40. This plasma gas is nonoxidizing and may be composed of nitrogen and hydrogen with argon, or helium as a carrier. The plasma flame exuding from the nozzle 44 draws the powder therewith by aspiration and subjects the powder ingredients to high temperatures to cause them to melt. The jet stream carries the melted metal into the bottom of the groove 29 of each piston ring and fills the groove.

After the coating is deposited it is bound to the base body of the ring of the piston. The fused-in coating forms in situ in the groove of the piston ring and is bonded to the body of the ring along a fused interface or welded zone. The interface or zone is composed of materials of the coating and the material of the ring body.

During the jet spray application it is desired to maintain a temperature in the groove of the piston ring such that excessive burning and melting away of the body metal is prevented. To achieve this end result, the arbor of the rings is preferably cooled with an external blast of inert gas impinging on both sides of the jet flame. It is desirable to keep the temperatures of the rings in the arbor around 400° F. or less. It is not necessary to provide any subsequent heat treatment for the plasma jet coated rings other than allowing the rings to air cool.

The powder fed to the inlet of the plasma jet spray gun is metered preferably with the aid of an aspirating gas, vibration, mechanical gearing, etc. All the powder is completely melted and penetrates into the center cone of the plasma jet flame.

The following example illustrates a typical method for preparing the antifriction impregnated rings of the invention. Of course, this example is merely illustrative, and the invention is not to be limited thereto.

EXAMPLE I

A piston ring was first prepared with a pure molybdenum coating applied via the plasma jet spray technique described above. A number of rings were prepared in this manner constituting an arbor of rings. The molybdenum coatings had pore openings ranging from about 0.2 micron to about 10 microns and an open porosity of about 20 percent of volume.

A dispersion of an antifriction agent comprising graphite in mineral spirits was then prepared. Specifically, a commercial preparation of a 50 percent solids content of graphite dispersed in a mineral spirits carrier was further diluted. One gallon of the graphite dispersion was diluted with 2 gallons of mineral spirits, and thoroughly agitated to insure a homogeneous mixture.

The arbor of rings was placed in a preheated oven at 350° C. for 10 minutes. After 10 minutes the arbor of rings was removed from the oven and immediately sprayed with the diluted graphite solution. The graphite upon contacting the hot rings was absorbed into the pores of the ring coatings while the mineral spirits vehicle was evaporated from the rings. The arbor was then unloaded, the rings separated and dried for 30 minutes.

It is evident that this invention provides unique antifriction piston rings and a simple method of their preparation. The piston rings have particular utility in lessening friction and increasing scuff resistance during the critical period of engine break-in.

I claim:

1. A method of producing a piston ring having a bearing face coated with a hard porous metal or metal alloy and having its pores impregnated with a solid antifriction agent which comprises the steps of providing a piston ring having a bearing face, coating the bearing face of said piston ring with a hard porous metal or metal alloy, heating said coated ring to drive the air from the pores of the coating, and contacting said ring while still hot with a liquid carrier containing an antifriction agent, wherein said antifriction agent is drawn into the pores of said coating and remains therein as an impregnant of said coating, and said liquid carrier is evaporated.

2. The method of claim 1 wherein said heating step is carried out at a temperature ranging from about 300° F. to about 400° F.

3. The method of claim 1 wherein said antifriction agent is graphite.

4. The method of claim 3 wherein said liquid carrier is mineral spirits.

5. The method of claim 1 wherein said contact step is carried out by spraying said liquid carrier containing said antifriction agent on said coated piston ring.

6. The method of claim 1 wherein said contact step is carried out by immersing said coated piston ring in said liquid carrier containing said antifriction agent.

7. The method of claim 2 wherein said heating step is effected for a period of time ranging from about 5 minutes to about 30 minutes.

8. The method of claim 1 wherein said coating is a molybdenum coating.

9. The method of claim 1 wherein said coating is a molybdenum alloy coating.

10. The method of claim 1 wherein said coating is a tungsten carbide coating.

11. The method of claim 1 wherein said porous metal or metal alloy coating has an open porosity ranging from about 7 percent to about 30 percent by volume of the outer surface of said coated bearing face.

12. The method of claim 11 wherein said porosity is 7–20 percent.

13. The method of claim 1 wherein the pore openings of said metal or metal alloy coatings range from about 0.2 microns to about 10 microns.

* * * * *

UNITED STATES PATENT OFFICE
CERTIFICATE OF CORRECTION

Patent No. 3,617,349  Dated November 2, 1971

Inventor(s) Herbert F. Prasse

It is certified that error appears in the above-identified patent and that said Letters Patent are hereby corrected as shown below:

Column 5, line 9, "coating ring" should be --coated ring--;
Column 6, line 9, "extend" should be --expand--;
Column 6, line 75, "of volume" should be --by volume--.

Signed and sealed this 13th day of June 1972.

(SEAL)
Attest:

EDWARD M. FLETCHER, JR.
Attesting Officer

ROBERT GOTTSCHALK
Commissioner of Patents